US010288163B2

(12) United States Patent
Miller et al.

(10) Patent No.: US 10,288,163 B2
(45) Date of Patent: May 14, 2019

(54) METHOD AND SYSTEM FOR A PLANETARY POWER GEARBOX STATIC TO ROTATING OIL TRANSFER SUPPLY

(71) Applicant: General Electric Company, Schenectady, NY (US)

(72) Inventors: Brandon Wayne Miller, Middletown, OH (US); Gert Johannes van der Merwe, Lebanon, OH (US); Donald Albert Bradley, Cincinnati, OH (US); Michael Anthony Barnell, Loveland, OH (US); Christopher James Kroger, West Chester, OH (US)

(73) Assignee: General Electric Company, Schenectady, NY (US)

( * ) Notice: Subject to any disclaimer, the term of this patent is extended or adjusted under 35 U.S.C. 154(b) by 786 days.

(21) Appl. No.: 14/921,689

(22) Filed: Oct. 23, 2015

(65) Prior Publication Data
US 2017/0114887 A1    Apr. 27, 2017

(51) Int. Cl.
*F16H 57/04* (2010.01)
*F02K 3/06* (2006.01)
(Continued)

(52) U.S. Cl.
CPC ......... *F16H 57/0486* (2013.01); *F01D 25/18* (2013.01); *F02C 7/06* (2013.01);
(Continued)

(58) Field of Classification Search
CPC .............. F16H 57/0486; F16H 57/046; F16H 57/0456; F02C 7/06; F02C 7/32;
(Continued)

(56) References Cited

U.S. PATENT DOCUMENTS 2,535,689 A * 12/1950 McMahan ............... F01D 25/18
184/6.28
3,086,595 A  4/1963 Nichols
(Continued)

FOREIGN PATENT DOCUMENTS

CA    2494737 C    3/2004
FR    3 010 449 A1    3/2015
(Continued)

OTHER PUBLICATIONS

Notification of Reasons for Refusal issued in connection with corresponding JP Application No. 2016-203204 dated Nov. 21, 2017.
(Continued)

*Primary Examiner* — Eldon T Brockman
(74) *Attorney, Agent, or Firm* — Dority & Manning, P.A.

(57) ABSTRACT

A static lubricant supply system within a gearbox that delivers lubricant to rotating gears. The lubricant supply system includes a stationary sleeve assembly for delivering the lubricant to a rotating receiver member, shaft, or flange. The sleeve assembly includes bearings, seals, jets, and plenums. The jets are skewed to deliver lubricant in the tangential direction of rotational motion of the receiver member, shaft, or flange. In the radial gap transfer configuration, the sleeve assembly circumscribes the receiver member or shaft. A race in the receiver member or shaft receives the lubricant. Channels within the receiver member, shaft, and gears deliver lubricant to the gears. In the axial gap transfer configuration, the sleeve assembly transfers lubricant to a flange attached to a receiver member. The flange has a race that receives the lubricant from the jets. Channels within the flange, receiver member, and gears deliver lubricant to the gears.

18 Claims, 7 Drawing Sheets

(51) Int. Cl.
  *F01D 25/18* (2006.01)
  *F02C 7/06* (2006.01)
  *F02C 7/32* (2006.01)

(52) U.S. Cl.
  CPC ............. *F02K 3/06* (2013.01); *F16H 57/046* (2013.01); *F02C 7/32* (2013.01); *F05D 2240/50* (2013.01); *F05D 2260/40311* (2013.01); *F05D 2260/98* (2013.01); *Y02T 50/671* (2013.01)

(58) Field of Classification Search
  CPC ... F02C 7/36; F01D 25/18; F02K 3/06; Y02T 50/671; F05D 2260/98; F05D 2260/40311; F05D 2240/50
  See application file for complete search history.

(56) References Cited

U.S. PATENT DOCUMENTS

| | | | |
|---|---|---|---|
| 3,292,602 | A | 12/1966 | Stewart |
| 6,077,040 | A | 6/2000 | Pruden et al. |
| 6,758,598 | B2 | 7/2004 | Beauvais et al. |
| 8,133,027 | B2 | 3/2012 | Carvalho et al. |
| 8,484,942 | B1 | 7/2013 | McCune et al. |
| 8,636,615 | B2 | 1/2014 | Suzuki et al. |
| 8,813,469 | B2 | 8/2014 | Sheridan |
| 8,931,285 | B2 * | 1/2015 | McCune ................ F01D 25/18 60/792 |
| 9,051,044 | B2 * | 6/2015 | Talasco ................ B64C 11/306 |
| 9,677,420 | B2 * | 6/2017 | McCune ................ F01D 25/18 |
| 9,995,174 | B2 * | 6/2018 | McCune ................ F01D 25/18 |
| 2004/0037483 | A1 | 2/2004 | Beauvais et al. |
| 2011/0286841 | A1 * | 11/2011 | Talasco ................ B64C 11/306 416/1 |
| 2011/0286842 | A1 | 11/2011 | Danielson et al. |
| 2012/0192570 | A1 | 8/2012 | McCune et al. |
| 2013/0172144 | A1 | 7/2013 | Suzuki et al. |
| 2013/0283757 | A1 * | 10/2013 | Bordne ................ F01D 25/125 60/39.08 |
| 2014/0147275 | A1 | 5/2014 | Plickys et al. |
| 2014/0230452 | A1 * | 8/2014 | McCune ................ F01D 25/18 60/792 |
| 2014/0271151 | A1 | 9/2014 | Belmonte et al. |
| 2014/0369818 | A1 * | 12/2014 | McCune ................ F01D 25/18 415/124.1 |
| 2017/0023123 | A1 * | 1/2017 | McCune ................ F02C 7/06 |
| 2017/0276046 | A1 * | 9/2017 | McCune ................ F01D 25/18 |
| 2018/0216489 | A1 * | 8/2018 | Curlier ................ F01D 25/18 |

FOREIGN PATENT DOCUMENTS

| | | | |
|---|---|---|---|
| FR | 3 018 861 A1 | 9/2015 | |
| JP | 2015-513648 A | 5/2015 | |
| WO | WO 2014011245 A2 * | 1/2014 | ......... F16H 57/0471 |
| WO | 2015/094539 A1 | 6/2015 | |

OTHER PUBLICATIONS

U.S. Appl. No. 14/857,164, filed Sep. 17, 2015, entitled Multi-Directional Gearbox Deflection Limiter for a Gas Turbine Engine.
U.S. Appl. No. 14/865,265, filed Sep. 25, 2015, entitled Planet Gearbox With Cylindrical Roller Bearing With High Density Roller Packing.
U.S. Appl. No. 14/865,239, filed Sep. 25, 2015, entitled Double Row Cylindrical Roller Bearing With High Length to Diameter Ratio Rollers.
U.S. Appl. No. 14/886,372, filed Oct. 19, 2015, entitled Planet Gearbox With Cylindrical Roller Bearing With Under Race Lube Scheme.
U.S. Appl. No. 14/876,124, filed Oct. 6, 2015, entitled Gas Turbine Gearbox Input Shaft.
Extended European Search Report and Opinion issued in connection with corresponding EP Application No. 16194784.1 dated Mar. 20, 2017.

* cited by examiner

METHOD AND SYSTEM FOR A PLANETARY POWER GEARBOX STATIC TO ROTATING OIL TRANSFER SUPPLY

BACKGROUND

The field of the disclosure relates generally to gas turbine engines and, more particularly, to a method and system for supplying lubricant to an integrated drive power gearbox.

Gas turbine engines typically include integrated drive power gearboxes that transfer energy from one shaft to another shaft. Planetary integrated drive power gearboxes are typically used in aircraft engines because of their compact design. However, high rotational speeds and torsional forces acting on the planetary shafts can heat the planetary gears to extremely high temperatures. Constant lubrication is used to maintain proper operating temperatures and reduce friction in the gearbox. Lubricant supply systems add weight to the aircraft and occupy valuable space. More efficient lubricant supply systems can occupy less space and reduce the weight of the aircraft, which tends to improve fuel efficiency.

BRIEF DESCRIPTION

In one aspect, a gas turbine engine assembly is provided. The gas turbine engine includes a fan assembly including an axis of rotation. The gas turbine assembly also includes a gear assembly configured to drive the fan assembly through a first shaft from a coupling to a power drive shaft. The gear assembly includes a sleeve assembly at least partially surrounding the power drive shaft and coupled within a housing of the gear assembly. The sleeve assembly configured to receive a plurality of externally modulated flows of oil through the power drive shaft and to distribute the flows of oil through respective channels of a plurality of sleeve channels. The channels angled with respect to a radial line extending from the sleeve assembly in a direction of rotation of a rotating receiver of the sleeve assembly. The sleeve assembly includes a bearing assembly integral with the sleeve assembly. A diameter of an inner surface of the bearing assembly being approximately equal to an outer diameter of a surface of the power drive shaft. The sleeve assembly includes one or more seals extending circumferentially between the sleeve assembly and the power drive shaft. The one or more seals spaced axially at least one of forward of the bearing assembly and aft of the bearing assembly. An oil deflection shield circumscribing the power drive shaft at least one of forward of the one or more seals and aft of the one or more seals.

In another aspect, a method of lubricating a gearbox is provided. The method for lubricating a gearbox includes supplying a flow of lubricant through a plurality of conduits to the gearbox. Passing a portion of the supplied lubricant through the gearbox to a downstream lubricant load. Channeling the flow of lubricant to a jet opening configured to direct the flow of lubricant across a gap from a stationary member to a rotating member. Channeling the flow of lubricant to a planetary gear assembly with in the gearbox. The planetary gear assembly includes a plurality of planetary gears supported by a carrier. The carrier coupled to a load through a shaft.

In yet another aspect, a turbofan engine is provided. The turbofan engine includes a core engine including a multistage compressor. The turbofan engine also includes a fan assembly including an axis of rotation and powered by the core engine. The turbofan engine also includes a fan bypass duct at least partially surrounding the core engine and the fan. The turbofan engine also includes a gear assembly configured to drive the fan assembly through a first shaft from a coupling to a power drive shaft. The gear assembly includes a sleeve assembly at least partially surrounding the power drive shaft and coupled to a housing of the gear assembly. The sleeve assembly configured to receive a plurality of externally modulated flows of oil through the power drive shaft and to distribute the flows of oil through respective channels of a plurality of radially outwardly directed channels. The channels angled with respect to a radial line extending from the sleeve assembly in a direction of rotation of power drive shaft. The sleeve assembly includes a bearing assembly integral with the sleeve assembly. A diameter of an inner surface of the bearing assembly being approximately equal to an outer diameter of a surface of the power drive shaft. The sleeve assembly also includes one or more seals extending circumferentially between the sleeve assembly and the power drive shaft. The one or more seals spaced axially at least one of forward of the bearing assembly and aft of the bearing assembly. An oil deflection shield circumscribing the power drive shaft at least one of forward of the one or more seals and aft of the one or more seals.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIGS. 1-7 show example embodiments of the method and apparatus described herein.

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The following detailed description illustrates embodiments of the disclosure by way of example and not by way of limitation. It is contemplated that the disclosure has general application to a method and system for supplying lubricant to an integrated drive power gearbox.

Embodiments of the integrated drive power gearbox lubrication supply system (LSS) described herein provide lubrication to an integrated drive power gearbox of a gas turbine engine. The LSS includes a sleeve assembly that circumscribes at least a portion of a power shaft. The sleeve assembly includes a bearing assembly, seal members, an oil deflection shield that circumscribes at least a portion of the power shaft, and channels that deliver lubricant from the sleeve assembly to the gears. The sleeve assembly is configured to deliver a flow of lubricant from the lubrication supply system to the rotating gears of the integrated drive power gearbox.

The LSS described herein offers advantages over known methods of supplying lubricant to an integrated drive power gearbox. More specifically, some known lubrication supply systems are heavier and less reliable than the system described herein. Supplying lubricant directly to the gears in the integrated drive power gearbox enhances the lubrication of the integrated drive power gearbox. Furthermore, some known lubrication supply systems are inefficient at cooling the gears within the integrated drive power gearbox. Excess heat within the integrated drive power gearbox can affect the life and the reliability of the integrated drive power gearbox.

Figure 1:
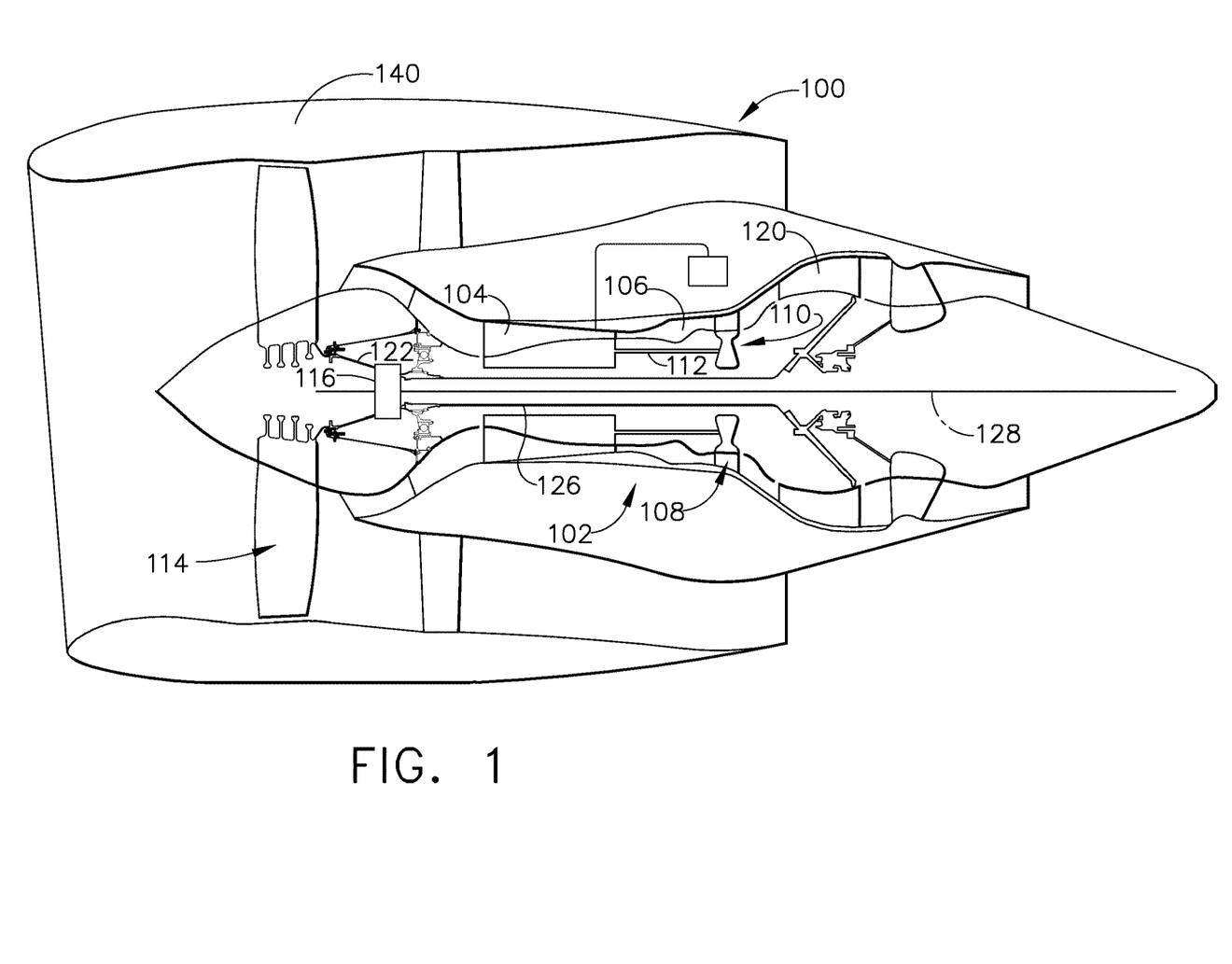
FIG. 1 is a schematic view of a gas turbine engine.

FIG. 1 is a schematic illustration of an exemplary gas turbine engine 100. Gas turbine engine 100 includes a gas generator or core engine 102 that includes a high pressure compressor (HPC) 104, a combustor assembly 106, and a high pressure turbine (HPT) 108 in an axial serial flow relationship on a core engine rotor 110 rotating about a core engine shaft 112. Gas turbine engine 100 also includes a low pressure compressor or fan 114 and a low pressure turbine 120 arranged in an axial flow relationship on a power engine rotor 122. An integrated drive power gearbox 116 is axially coupled to both power engine rotor 122 and power engine shaft 126.

During operation, air flows along a central axis 128, and compressed air is supplied to high pressure compressor 104. The highly compressed air is delivered to combustor assembly 106. Exhaust gas flow (not shown in FIG. 1) from combustor assembly 106 drives turbines 108 and 120, and turbine 120 drives power engine shaft 126. Power engine shaft 126 drives integrated drive power gearbox 116 which drives power engine rotor 122 and low pressure compressor or fan 114. Gas turbine engine 100 also includes a fan or low pressure compressor containment case 140.

Figure 2:
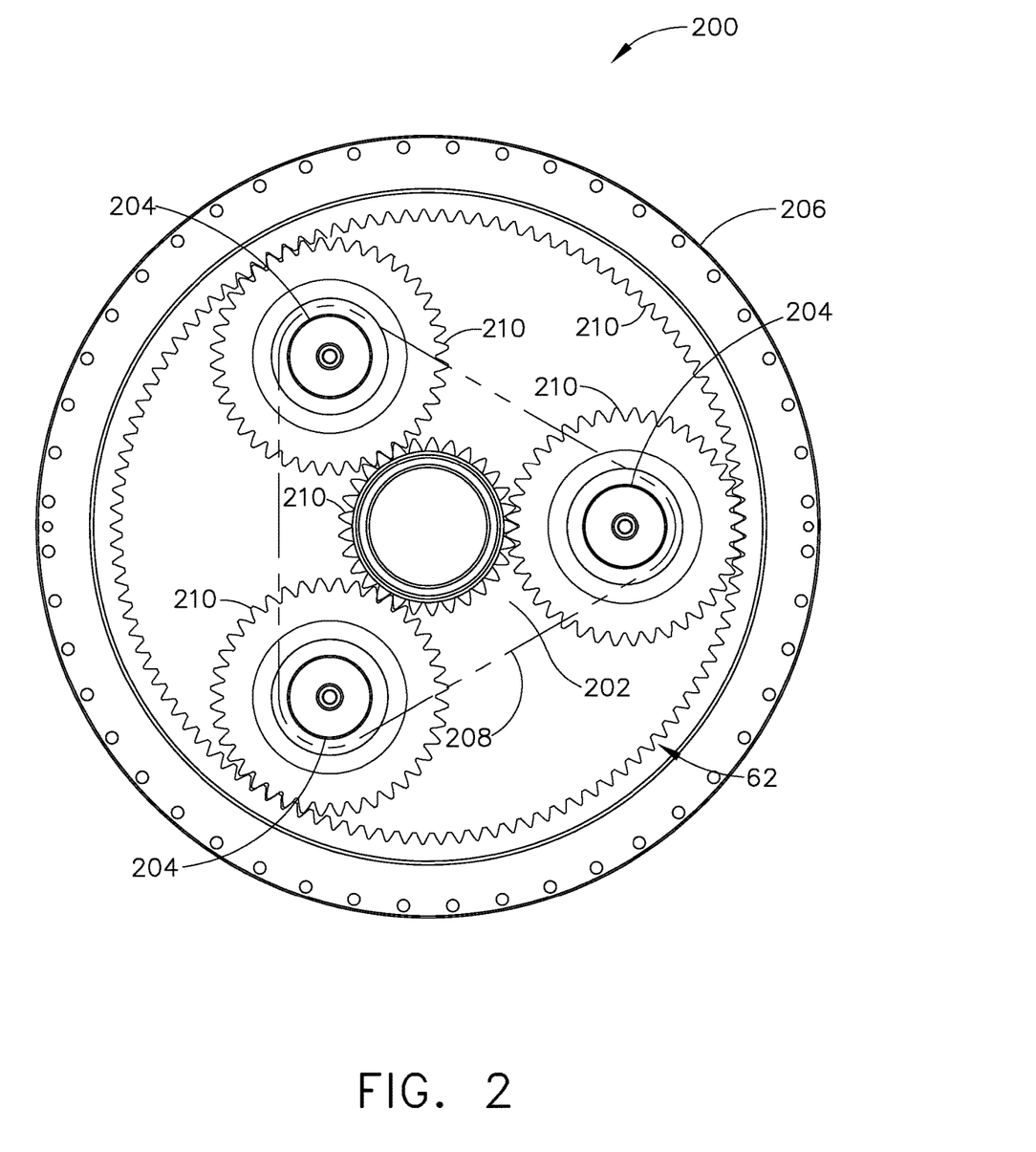
FIG. 2 is a schematic diagram of an epicyclic planetary gear.

FIG. 2 is a schematic diagram of an epicyclic gear train 200. In the exemplary embodiment, epicyclic gear train 200 is a planetary gear train. In one embodiment, epicyclic gear train 200 is housed within integrated drive power gearbox 116 (shown in FIG. 1). In other embodiments, epicyclic gear train 200 is located adjacent integrated drive power gearbox 116 (shown in FIG. 1) and is mechanically coupled to it.

Epicyclic gear train 200 includes a sun gear 202, a plurality of planetary gears 204, a ring gear 206, and a carrier 208. It is understood that the invention is not limited to three planetary gears 204 as shown in FIG. 2. Rather, any number of planetary gears may be used. In some embodiments, power engine shaft 126 (shown in FIG. 1) is fixedly coupled to sun gear 202. Sun gear 202 is configured to engage planetary gears 204 through a plurality of complementary teeth 210 circumferentially spaced about a radially outer periphery of sun gear 202 and a radially outer periphery of planetary gears 204. Planetary gears 204 are maintained in a position relative to each other using carrier 208. Planetary gears 204 are rotationally coupled to power engine rotor 122 (shown in FIG. 1) extending axially from carrier 208. Planetary gears 204 are configured to engage ring gear 206 through complementary teeth 210 circumferentially spaced about a radially inner periphery of ring gear 206 and a radially outer periphery of planetary gears 204. Ring gear 206 is fixedly coupled to integrated drive power gearbox 116 (shown in FIG. 1).

Epicyclic gear train 200 can be configured in three possible operational embodiments: planetary, star, and solar. In the planetary operational embodiment, ring gear 206 remains stationary while sun gear 202, planetary gears 204, and carrier 208 rotate. Power engine shaft 126 (shown in FIG. 1) drives sun gear 202 which is configured to rotate planetary gears 204 that are configured to rotate carrier 208. Carrier 208 drives power engine rotor 122 (shown in FIG. 1) and low pressure compressor or fan 114 (shown in FIG. 1). Sun gear 202 and carrier 208 rotate in the same direction.

In the star operational embodiment, carrier 208 remains stationary while sun gear 202 and ring gear 206 rotate. Power engine shaft 126 (shown in FIG. 1) drives sun gear 202 which is configured to rotate planetary gears 204. Planetary gears 204 are configured to rotate ring gear 206 and carrier 208 is fixedly coupled to integrated drive power gearbox 116 (shown in FIG. 1). Carrier 208 maintains planetary gears 204 positioning while allowing planetary gears 204 to rotate. Ring gear 206 is rotationally coupled to power engine rotor 122 (shown in FIG. 1) and extends axially from ring gear 206. Sun gear 202 and ring gear 206 rotate in opposite directions.

In the solar operational embodiment, sun gear 202 remains stationary while planetary gears 204, ring gear 206, and carrier 208 rotate. Power engine shaft 126 (shown in FIG. 1) can drive either the ring gear 206 or carrier 208. When power engine shaft 126 (shown in FIG. 1) is coupled to carrier 208, planetary gears 204 are configured to rotate ring gear 206 which drives power engine rotor 122 (shown in FIG. 1) and low pressure compressor or fan 114 (shown in FIG. 1). Ring gear 206 and carrier 208 rotate in the same direction.

In the solar operational embodiment where power engine shaft 126 (shown in FIG. 1) is coupled to ring gear 206, ring gear 206 is configured to rotate planetary gears 204 and carrier 208. Carrier 208 drives power engine rotor 122 (shown in FIG. 1) and low pressure compressor or fan 114 (shown in FIG. 1). Ring gear 206 and carrier 208 rotate in the same direction.

Figure 3:
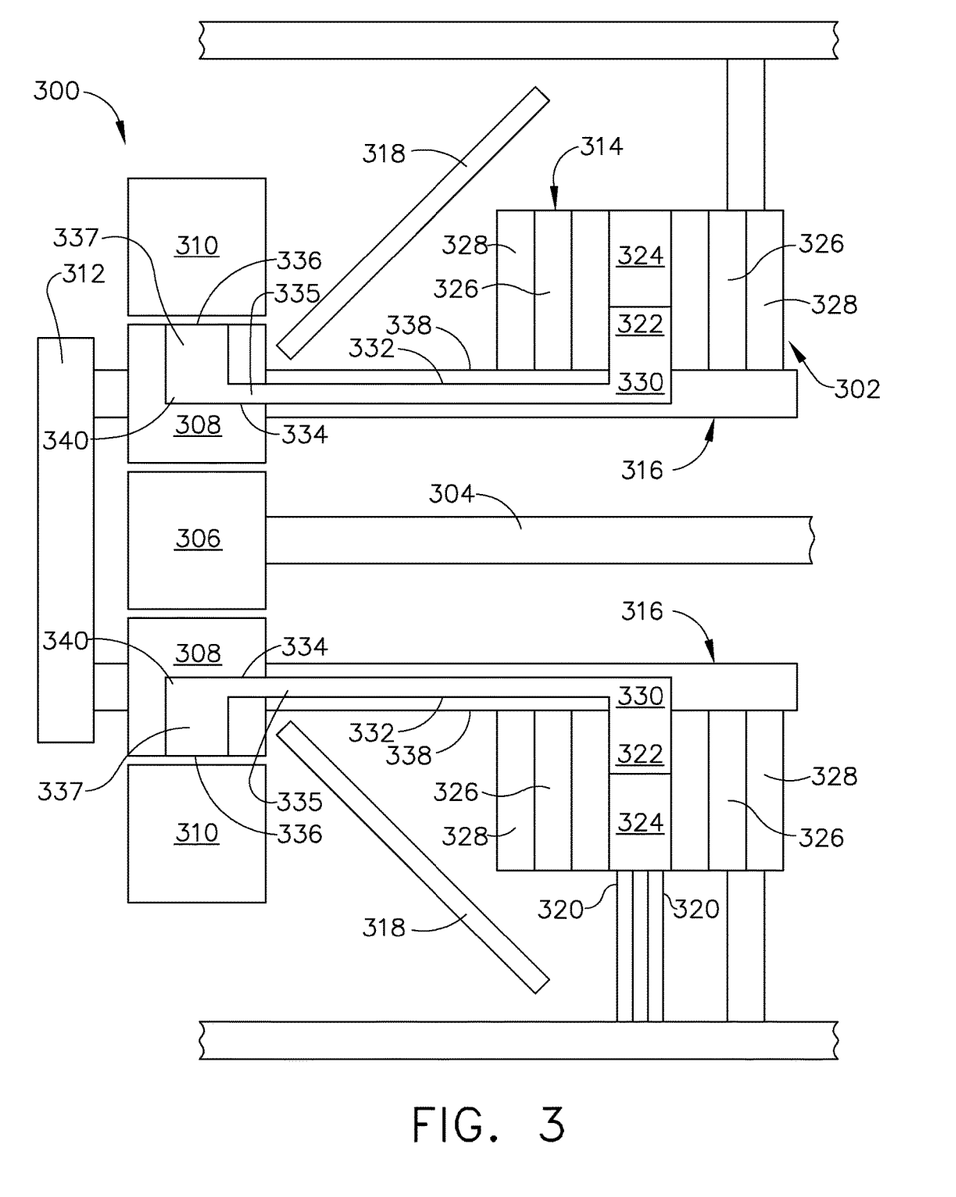
FIG. 3 is a sectional view of an integrated drive power gearbox lubricating systems with lubricant delivered by radial gap transfer to the carrier and planetary gears.

FIG. 3 is a side elevation view of an epicyclic gear train 300 in accordance with an exemplary embodiment of the present disclosure. In the exemplary embodiment, epicyclic gear train 300 includes a lubricant supply system 302 configured to deliver lubricant through a radial gap transfer. Epicyclic gear train 300 includes a power engine shaft 304, a sun gear 306, a plurality of planetary gears 308, a ring gear 310, and a carrier 312. Lubricant supply system 302 includes a sleeve 314, a receiver member 316, an oil deflection shield 318, and a plurality of lubricant supply tubes 320. Sleeve 314 includes a plurality of jets 322, a plurality of plenums 324, a plurality of bearings assemblies 326, and a plurality of seals 328. Receiver member 316 includes a race 330 and a plurality of receiver member channels 332. Planetary gears 308 include a plurality of planetary gear channels 334 and a plurality of planetary gear openings 336.

Epicyclic gear train 300 has the same structural configuration as epicyclic gear train 200 (shown in FIG. 2) with the addition of lubricant supply system 302. Lubricant supply system 302 is in flow communication with sleeve 314 through lubricant supply tubes 320. Sleeve 314 is in flow communication with receiver member 316 through jets 322 and race 330. Receiver member 316 is in flow communication with planetary gears 308 through receiver member channels 332 and planetary gear channels 334. Planetary gears 308 are in flow communication with the epicyclic gear train 300 through planetary gear channels 334 and planetary gear openings 336.

Lubricant supply system 302 is in flow communication with sleeve 314 through lubricant supply tubes 320 and sleeve 314 is in flow communication with receiver member 316. Sleeve 314 circumscribes receiver member 316 and is fixedly coupled to integrated drive power gearbox 116 (shown in FIG. 1). Lubricant supply tubes 320 are coupled in flow communication with plenums 324 which are coupled in flow communication with jets 322. Jets 322 are coupled in flow communication with race 330 and are skewed to direct lubricant in the tangential direction of rotational motion of receiver member 316. Sleeve 314 includes bearing assemblies 326 circumscribing receiver member 316 and positioned axially forward and aft of jets 322. Bearing assemblies 326 may be journal bearings, rolling-element bearings, or any other suitable bearings. Sleeve 314 includes seals 328 circumscribing receiver member 316 and positioned axially forward and aft of bearing assemblies 326. In an embodiment, seals 328 are carbon seals. In another embodiment, seals 328 are fabricated from any other suitable material.

Sleeve 314 is in flow communication with epicyclic gear train 300 through receiver member 316 which is rotationally coupled to and extends axially aft from planetary gears 308. In the exemplary embodiment, receiver member 316 is cylindrical and circumscribes power engine shaft 304. Race 330 is located on a radially outer surface of receiver member 338. Receiver member channels 332 are disposed within receiver member 316 and coupled in flow communication with race 330. Planetary gear channels 334 are disposed within planetary gears 308 and coupled in flow communication with receiver member channels 332. Planetary gear channels 334 include a first portion 335 and a second portion 337. First portion 335 extends axially forward from receiver member channels 332 to a point 340 within planetary gears 308. Second portion 337 extends radially outward from point 340 within planetary gears 308 to planetary gear openings 336 on the radially outer surface of planetary gears 308.

Oil deflection shield 318 circumscribes receiver member 316 and sleeve 314 and is fixedly coupled to integrated drive power gearbox 116 (shown in FIG. 1). Oil deflection shield 318 is configured to collect lubricant removed from planetary gears 308, sun gear 306, and ring gear 310 and return the lubricant to lubricant supply system 302.

Epicyclic gear train 300 is configured in the planetary operational embodiment. Ring gear 310 remains stationary while sun gear 306, planetary gears 308, and carrier 312 rotate. Power engine shaft 304 drives sun gear 306 which is configured to rotate planetary gears 308. Planetary gears 308 are configured to rotate carrier 312, receiver member 316, and race 330. Carrier 312 drives power engine rotor 122 (shown in FIG. 1) and low pressure compressor or fan 114 (shown in FIG. 1). Jets 322 are configured to deliver lubricant to race 330 and to remain stationary. Race 330 is configured to rotate during lubricant delivery and is configured to deliver lubricant to receiver member channels 332. Receiver member channels 332 are configured to deliver lubricant to planetary gear channels 334.

In another embodiment, openings (not shown) in a radially outer surface of receiver member 338 replace race 330. The openings (not shown) are skewed to receive lubricant in the tangential direction of rotational motion of receiver member 316.

Figure 4:
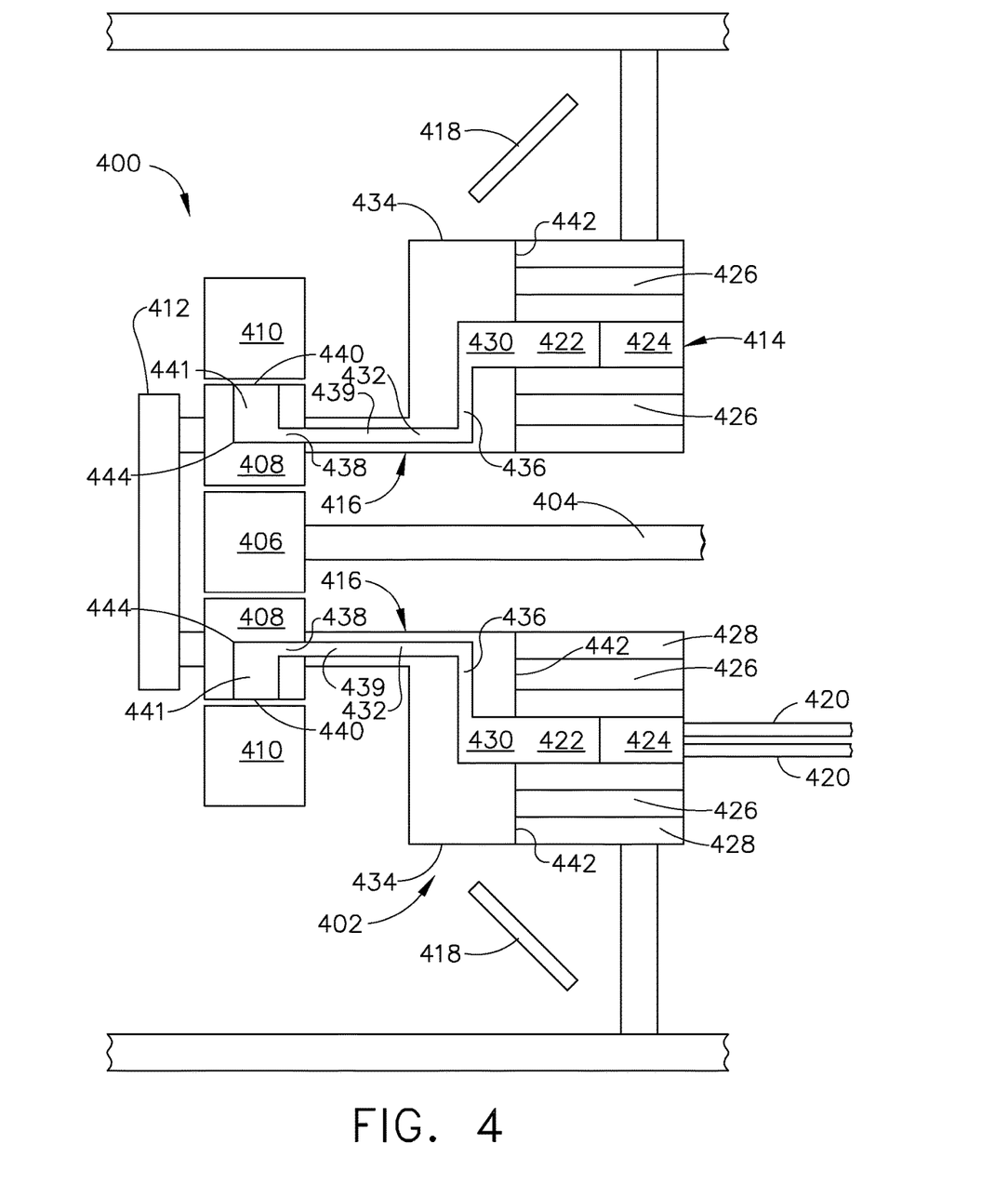
FIG. 4 is a sectional view of an integrated drive power gearbox lubricating systems with lubricant delivered by axial gap transfer to the carrier and planetary gears.

FIG. 4 is a side elevation view of an epicyclic gear train 400 in accordance with an exemplary embodiment of the present disclosure. In the exemplary embodiment, epicyclic gear train 400 includes a lubricant supply system 402 configured to deliver lubricant through an axial gap transfer. Epicyclic gear train 400 includes a power engine shaft 404, a sun gear 406, a plurality of planetary gears 408, a ring gear 410, and a carrier 412. Lubricant supply system 402 includes a sleeve 414, a receiver member 416, an oil deflection shield 418, and a plurality of lubricant supply tubes 420. Sleeve 414 includes a plurality of jets 422, a plurality of plenums 424, a plurality of bearings assemblies 426, and a plurality of seals 428. Receiver member 416 includes a race 430, a plurality of receiver member channels 432, a receiver member lip 434, and a receiver member lip channels 436. Planetary gears 408 include a plurality of planetary gear channels 438 and a plurality of planetary gear openings 440. The structure of the embodiment shown in FIG. 4 is similar to the structure of the embodiment shown in FIG. 3. However, an additional receiver member lip 434 is appended to receiver member 416 and sleeve 414 is oriented to deliver lubricant in the axial direction of power engine shaft 404 rather than in the radial direction.

Epicyclic gear train 400 has the same structural configuration as epicyclic gear train 200 (shown in FIG. 2) with the addition of lubricant supply system 402. Lubricant supply system 402 is in flow communication with sleeve 414 through lubricant supply tubes 420. Sleeve 414 is in flow communication with receiver member 416 through jets 422 and race 430. Receiver member 416 is in flow communication with planetary gears 408 through receiver member lip channels 436, receiver member channels 432, and planetary gear channels 438. Planetary gears 408 are in flow communication with the epicyclic gear train 400 through planetary gear channels 438 and planetary gear openings 440.

Lubricant supply system 402 is in flow communication with sleeve 414 through lubricant supply tubes 420 and sleeve 414 is in flow communication with receiver member 416. Sleeve 414 circumscribes power engine shaft 404 and is fixedly coupled to integrated drive power gearbox 116 (shown in FIG. 1). Lubricant supply tubes 420 are coupled in flow communication with plenums 424 which are coupled in flow communication with jets 422. Jets 422 are coupled in flow communication with race 430. Sleeve 414 and jets 422 are configured to deliver lubricant in the axially forward direction. Jets 422 are skewed to direct lubricant in the tangential direction of rotational motion of receiver member 416. Sleeve 414 includes bearing assemblies 426 positioned radially inward and outward of jets 422. Bearing assemblies 426 may be journal bearings, rolling-element bearings, or any other suitable bearings. Sleeve 414 includes seals 428 positioned radially inward and outward of bearing assemblies 426. In an embodiment, Seals 428 are carbon seals. In another embodiment, seals 428 are fabricated from any other suitable material.

Sleeve 414 is in flow communication with epicyclic gear train 400 through receiver member 416. Receiver member 416 is rotationally coupled to and extends axially aft from planetary gears 408. In the exemplary embodiment, receiver member 416 is cylindrical and circumscribes power engine shaft 404. Receiver member lip 434 is rotationally coupled to the end of receiver member 416 opposite the end coupled to planetary gears 408. Receiver member lip 434 has an inner diameter substantially similar to the inner diameter of receiver member 416 and extends radially outward from the axis of power engine shaft 404 at the end of receiver member 416. Receiver member lip 434 includes race 430 in an axially aft facing surface of receiver member lip 442. Receiver member lip 434 includes receiver member lip channels 436 in flow communication with race 430. Receiver member channels 432 are disposed within receiver member 416 and coupled in flow communication with receiver member lip channels 436. Planetary gear channels 438 are disposed within planetary gears 408 and coupled in flow communication with receiver member channels 432. Planetary gear channels 438 include a first portion 439 and a second portion 441. First portion 439 extends axially forward from receiver member channels 432 to a point 444 within planetary gears. Second portion 441 extends radially outward from point 444 within planetary gears 408 to planetary gear openings 440 on the radially outer surface of planetary gears 408.

Oil deflection shield 418 circumscribes receiver member 416 and sleeve 414 and is fixedly coupled to integrated drive power gearbox 116 (shown in FIG. 1). Oil deflection shield 418 is configured to collect lubricant removed from planetary gears 408, sun gear 406, and ring gear 410 and return the lubricant to lubricant supply system 402.

Epicyclic gear train 400 is configured in the planetary operational embodiment. Ring gear 410 remains stationary while sun gear 406, planetary gears 408, and carrier 412 rotate. Power engine shaft 404 drives sun gear 406 which is configured to rotate planetary gears 408. Planetary gears 408 are configured to rotate carrier 412, receiver member 416, receiver member lip 434, and race 430. Carrier 412 drives power engine rotor 122 (shown in FIG. 1) and low pressure compressor or fan 114 (shown in FIG. 1). Jets 422 are configured to deliver lubricant to race 430 and are configured to remain stationary. Race 430 is configured to rotate during lubricant delivery and to deliver lubricant to receiver member lip channels 436. Receiver member lip channels 436 are configured to deliver lubricant to receiver member channels 432 which are configured to deliver lubricant to planetary gear channels 438 and planetary gear openings 440.

In another embodiment, openings (not shown) in an axially aft facing surface of receiver member lip 442 replace race 430. The openings (not shown) are skewed to receive lubricant in the tangential direction of rotational motion of receiver member 416.

Figure 5:
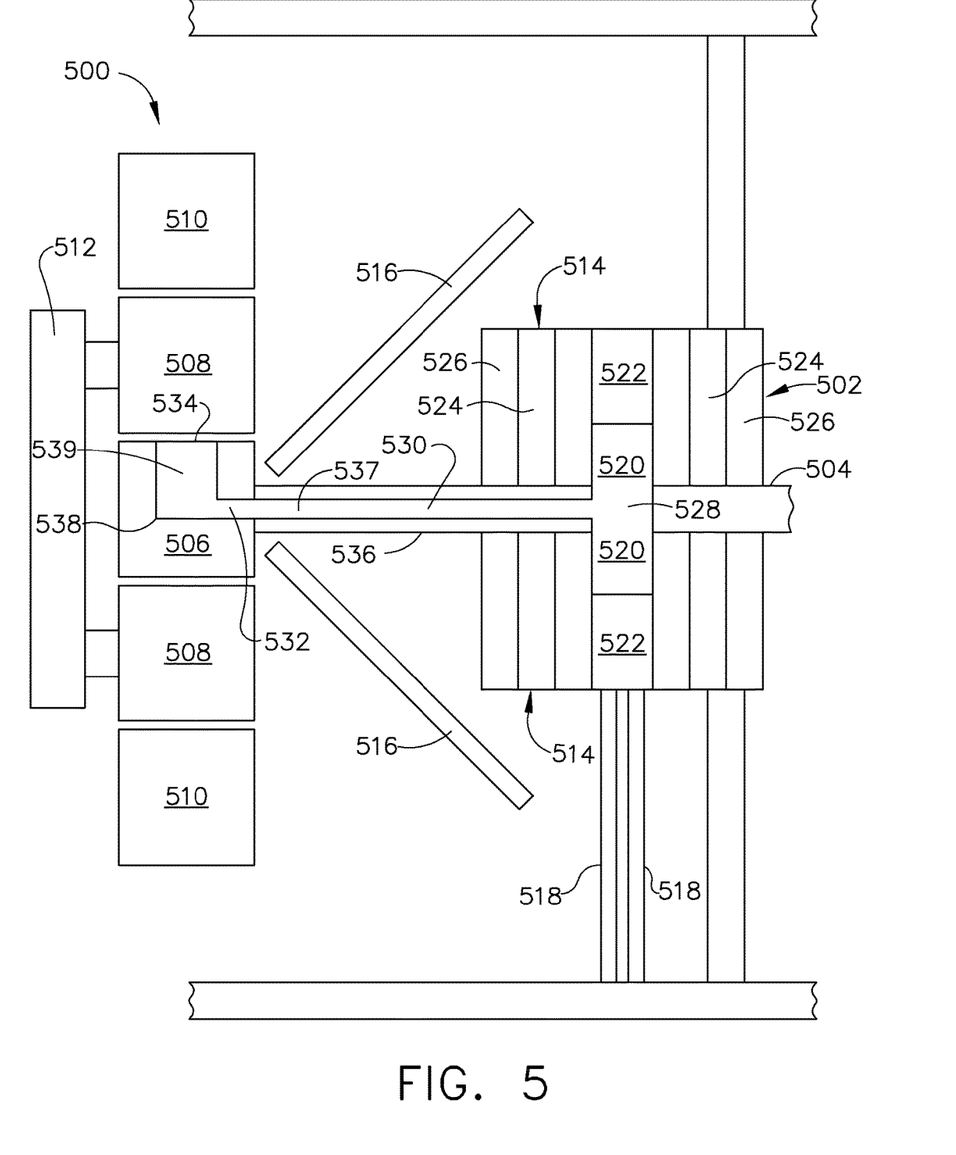
FIG. 5 is a sectional view of an integrated drive power gearbox lubricating systems with lubricant delivered by radial gap transfer to the power shaft and sun gear.

FIG. 5 is a side elevation view of an epicyclic gear train 500 in accordance with an exemplary embodiment of the present disclosure. In the exemplary embodiment, epicyclic gear train 500 includes a lubricant supply system 502 configured to deliver lubricant through a radial gap transfer to a power engine shaft 504 and a sun gear 506. Epicyclic gear train 500 includes power engine shaft 504, sun gear 506, a plurality of planetary gears 508, a ring gear 510, and a carrier 512. Lubricant supply system 502 includes a sleeve 514, an oil deflection shield 516, and a plurality of lubricant supply tubes 518. Sleeve 514 includes a plurality of jets 520, a plurality of plenums 522, a plurality of bearings assemblies 524, and a plurality of seals 526. Power engine shaft 504 includes a race 528 and a plurality of power engine shaft channels 530. Sun gear 506 includes a plurality of sun gear channels 532 and a plurality of sun gear openings 534.

Epicyclic gear train 500 has the same structural configuration as epicyclic gear train 200 (shown in FIG. 2) with the addition of lubricant supply system 502. Lubricant supply system 502 is in flow communication with sleeve 514 through lubricant supply tubes 518. Sleeve 514 is in flow communication with power engine shaft 504 through jets 520 and race 528. Power engine shaft 504 is in flow communication with sun gear 506 through power engine shaft channels 530 and sun gear channels 532. Sun gear 506 is in flow communication with the epicyclic gear train 500 through sun gear channels 532 and sun gear openings 534.

Lubricant supply system 502 is in flow communication with sleeve 514 through lubricant supply tubes 518 and sleeve 514 is in flow communication with power engine shaft 504. Sleeve 514 circumscribes power engine shaft 504 and is fixedly coupled to integrated drive power gearbox 116 (shown in FIG. 1). Lubricant supply tubes 518 are coupled in flow communication with plenums 522 which are coupled in flow communication with jets 520. Jets 520 are coupled in flow communication with race 528 and are skewed to direct lubricant in the tangential direction of rotational motion of the power engine shaft 504. Sleeve 514 includes bearing assemblies 524 circumscribing power engine shaft 504 and positioned axially forward and aft of jets 520. Bearing assemblies 524 may be journal bearings, rolling-element bearings, or any other suitable bearings. Sleeve 514 includes seals 526 circumscribing power engine shaft 504 and positioned axially forward and aft of bearing assemblies 524. In an embodiment, seals 526 are carbon seals. In another embodiment, seals 526 are fabricated from any other suitable material.

Sleeve 514 is in flow communication with epicyclic gear train 500 through power engine shaft 504. Power engine shaft 504 includes race 528 in a radially outer surface of power engine shaft 536 which also includes power engine shaft channels 530 that are coupled in flow communication with race 528. Sun gear 506 includes sun gear channels 532 coupled in flow communication with power engine shaft channels 530. Sun gear channels 532 include a first portion 537 and a second portion 539. First portion 537 extends axially forward from power engine shaft channels 530 to a point 538 within sun gear 506. Second portion 539 extends radially outward from point 538 to opening 534 on the radially outer surface of sun gear 506.

Oil deflection shield 516 circumscribes power engine shaft 504 and sleeve 514 and is fixedly coupled to integrated drive power gearbox 116 (shown in FIG. 1). Oil deflection shield 516 is configured to collect lubricant removed from planetary gears 508, sun gear 506, and ring gear 510 and return the lubricant to lubricant supply system 502.

Epicyclic gear train 500 is configured in either the planetary or star operational embodiments. In the planetary operational embodiment, ring gear 510 remains stationary while sun gear 506, planetary gears 508, and carrier 512 rotate. Power engine shaft 504 drives sun gear 506 and race 528. Sun gear 506 is configured to rotate planetary gears 508 which are configured to rotate carrier 512. Carrier 512 drives power engine rotor 122 (shown in FIG. 1) and low pressure compressor or fan 114 (shown in FIG. 1). Jets 520 are configured to deliver lubricant to race 528 and are configured to remain stationary while race 528 is configured to rotate during lubricant delivery. Race 528 is configured to deliver lubricant to power engine shaft channels 530. Power engine shaft channels 530 are configured to deliver lubricant to sun gear channels 532.

In the star operational embodiment, carrier 512 remains stationary while sun gear 506 and ring gear 510 rotate. Power engine shaft 504 drives sun gear 506 and race 528. Sun gear 506 is configured to rotate planetary gears 508 which are configured to rotate ring gear 510. Carrier 512 is fixedly coupled to integrated drive power gearbox 116 (shown in FIG. 1). Carrier 512 maintains planetary gears 508 positioning while allowing planetary gears 508 to rotate. Ring gear 510 is rotationally coupled to power engine rotor 122 (shown in FIG. 1). Jets 520 are configured to deliver lubricant to race 528 and are configured to remain stationary while race 528 is configured to rotate during lubricant delivery. Race 528 is configured to deliver lubricant to power engine shaft channels 530 which are configured to deliver lubricant to sun gear channels 532.

In another embodiment, openings (not shown) in a radially outer surface of power engine shaft 536 replace race 528. The openings (not shown) are skewed to receive lubricant in the tangential direction of rotational motion of power engine shaft 504.

Figure 6:
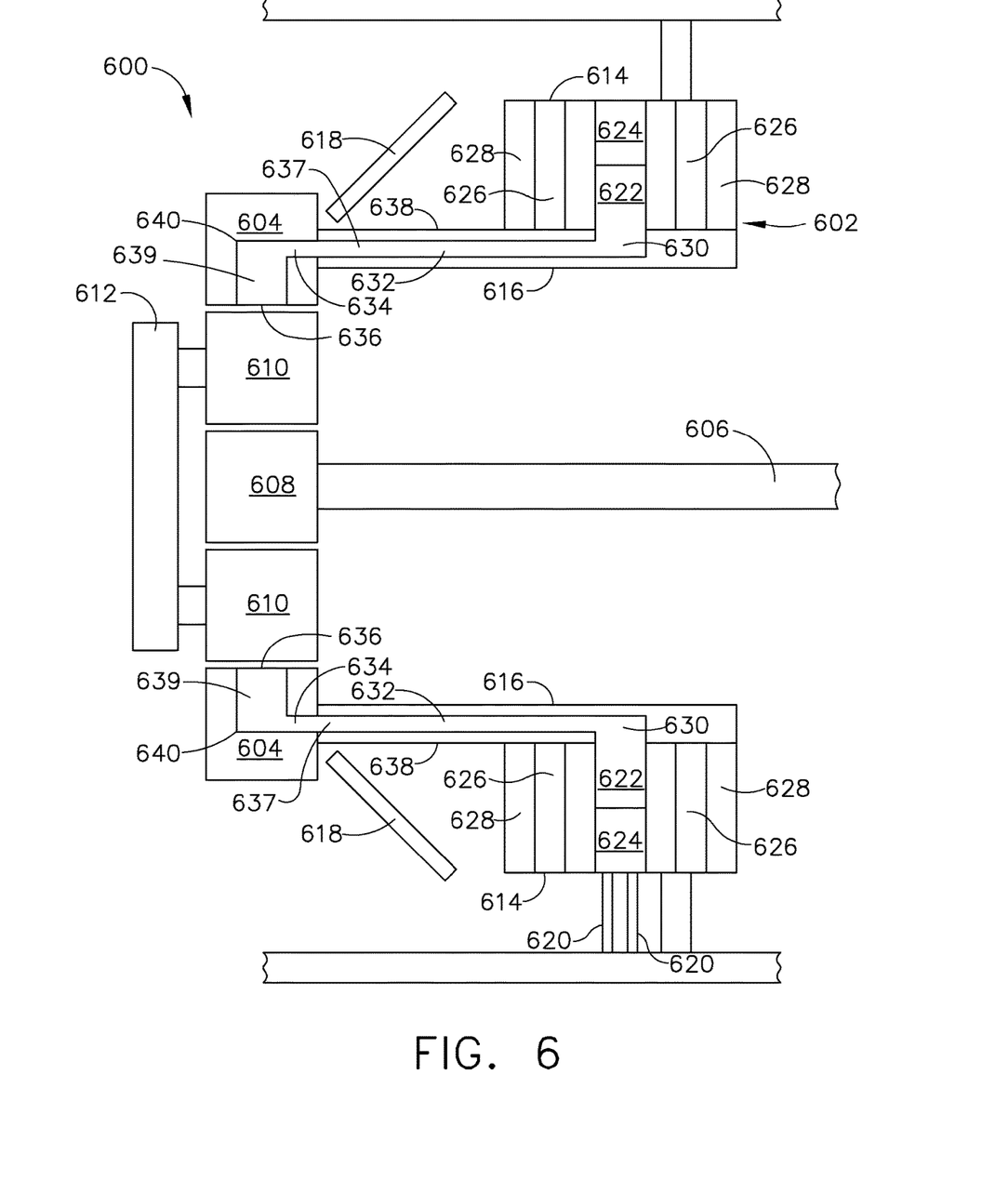
FIG. 6 is a sectional view of an integrated drive power gearbox lubricating systems with lubricant delivered by radial gap transfer to the ring gear.

The radial and axial gap transfer embodiments shown in FIG. 3 and FIG. 4 can also be applied to ring gear 206 (shown in FIG. 2). FIG. 6 is a side elevation view of an epicyclic gear train 600 in accordance with an exemplary embodiment of the present disclosure. In the exemplary embodiment, epicyclic gear train 600 includes a lubricant supply system 602 configured to deliver lubricant through a radial gap transfer to a ring gear 604. Epicyclic gear train 600 includes a power engine shaft 606, a sun gear 608, a plurality of planetary gears 610, ring gear 604, and a carrier 612. Lubricant supply system 602 includes a sleeve 614, a receiver member 616, an oil deflection shield 618, and a plurality of lubricant supply tubes 620. Sleeve 614 includes a plurality of jets 622, a plurality of plenums 624, a plurality of bearings assemblies 626, and a plurality of seals 628. Receiver member 616 includes a race 630 and a plurality of receiver member channels 632. Ring gear 604 includes a plurality of ring gear channels 634 and a plurality of ring gear openings 636.

Epicyclic gear train 600 has the same structural configuration as epicyclic gear train 200 (shown in FIG. 2) with the addition of lubricant supply system 602. Lubricant supply system 602 is in flow communication with sleeve 614 through lubricant supply tubes 620. Sleeve 614 is in flow communication with receiver member 616 through jets 622 and race 630. Receiver member 616 is in flow communication with ring gear 604 through receiver member channels 632 and ring gear channels 634. Ring gear 604 is in flow communication with the epicyclic gear train 600 through ring gear channels 634 and ring gear openings 636.

Lubricant supply system 602 is in flow communication with sleeve 614 through lubricant supply tubes 620 and sleeve 614 is in flow communication with receiver member 616. Sleeve 614 circumscribes receiver member 616 and is fixedly coupled to integrated drive power gearbox 116 (shown in FIG. 1). Lubricant supply tubes 620 are coupled in flow communication with plenums 624 which are coupled in flow communication with jets 622. Jets 622 are coupled in flow communication with race 630 and are skewed to direct lubricant in the tangential direction of rotational motion of the receiver member 616. Sleeve 614 includes bearing assemblies 626 circumscribing receiver member 616 and positioned axially forward and aft of jets 622. Bearing assemblies 626 may be journal bearings, rolling-element bearings, or any other suitable bearings. Sleeve 614 includes seals 628 circumscribing receiver member 616 and positioned axially forward and aft of bearing assemblies 626. In an embodiment, seals 628 are carbon seals. In another embodiment, seals 628 are fabricated from any other suitable material.

Sleeve 614 is in flow communication with epicyclic gear train 600 through receiver member 616 which is rotationally coupled to and extends axially aft from ring gear 604. In the exemplary embodiment, receiver member 616 is cylindrical and circumscribes power engine shaft 606. Race 630 is located on a radially outer surface of receiver member 638. Receiver member channels 632 are disposed within receiver member 616 and coupled in flow communication with race 630. Ring gear channels 634 are disposed within ring gear 604 and coupled in flow communication with receiver member channels 632. Ring gear channels 634 include a first portion 637 and a second portion 639. First portion 637 extends axially forward from receiver member channels 632 to a point 640 within ring gear 604. Second portion 639 extends radially inward from point 640 within ring gear 604 to ring gear openings 636 on the radially inner surface of ring gear 604.

Oil deflection shield 618 circumscribes receiver member 616 and sleeve 614 and is fixedly coupled to integrated drive power gearbox 116 (shown in FIG. 1). Oil deflection shield 618 is configured to collect lubricant removed from planetary gears 610, sun gear 608, and ring gear 604 and return the lubricant to lubricant supply system 602.

Epicyclic gear train 600 is configured in the star operational embodiment. Carrier 612 remains stationary while sun gear 608 and ring gear 604 rotate. Power engine shaft 606 drives sun gear 608 which is configured to rotate planetary gears 610. Planetary gears 610 are configured to rotate ring gear 604 and carrier 612 is fixedly coupled to integrated drive power gearbox 116 (shown in FIG. 1). Carrier 612 maintains planetary gears 610 positioning while allowing planetary gears 610 to rotate. Ring gear 604 is rotationally coupled to power engine rotor 122 (shown in FIG. 1). Jets 622 are configured to deliver lubricant to race 630 and to remain stationary while race 630 is configured to rotate during lubricant delivery. Race 630 is configured to deliver lubricant to receiver member channels 632 which are configured to deliver lubricant to ring gear channels 634.

In another embodiment, openings (not shown) in a radially outer surface of receiver member 638 replace race 630.

The openings (not shown) are skewed to receive lubricant in the tangential direction of rotational motion of receiver member 616.

Figure 7:
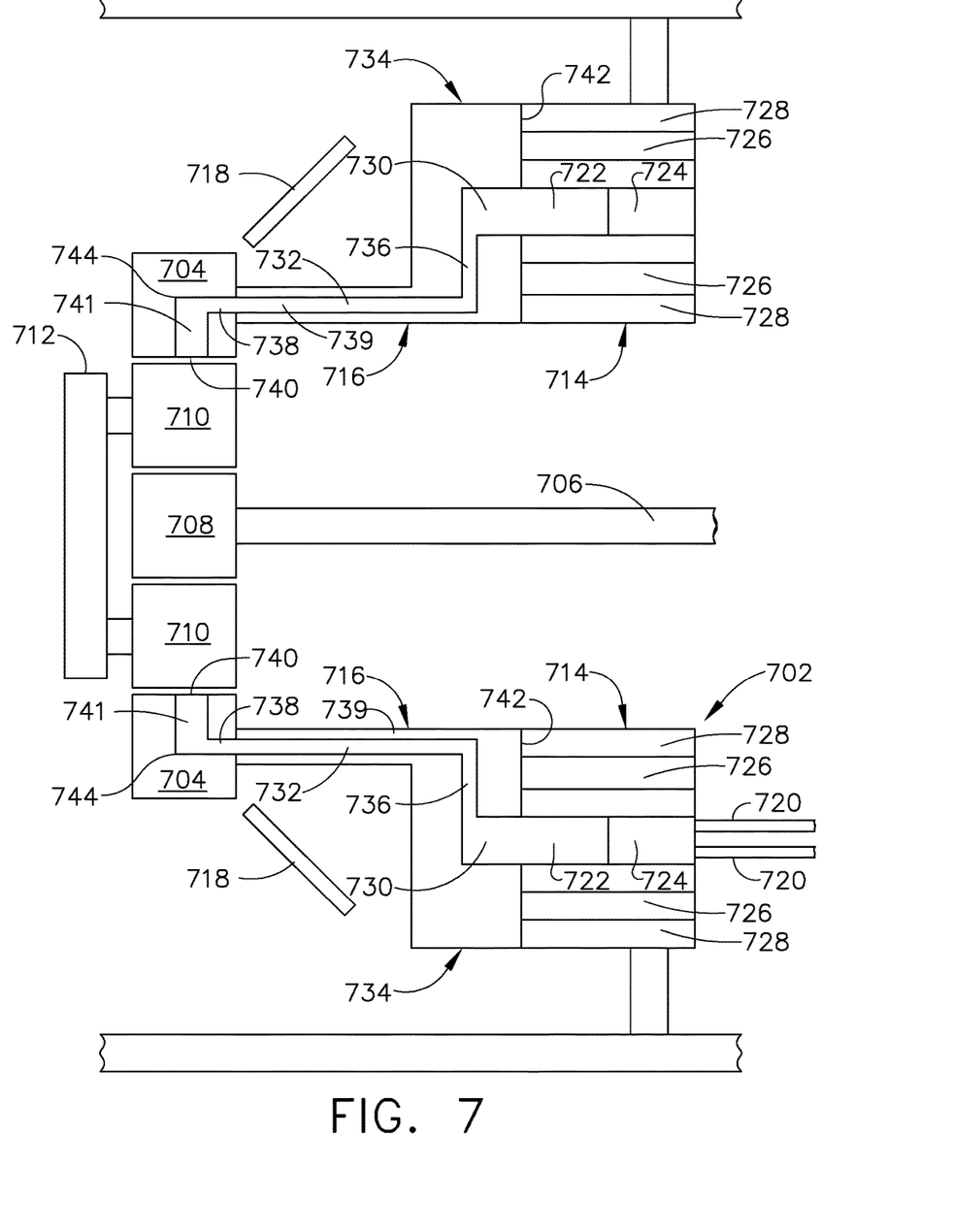
FIG. 7 is a sectional view of an integrated drive power gearbox lubricating systems with lubricant delivered by axial gap transfer to the ring gear.

FIG. 7 is a side elevation view of an epicyclic gear train 700 in accordance with an exemplary embodiment of the present disclosure. In the exemplary embodiment, epicyclic gear train 700 includes a lubricant supply system 702 configured to deliver lubricant through an axial gap transfer to ring gear 704. Epicyclic gear train 700 includes a power engine shaft 706, a sun gear 708, a plurality of planetary gears 710, ring gear 704, and a carrier 712. Lubricant supply system 702 includes a sleeve 714, a receiver member 716, an oil deflection shield 718, and a plurality of lubricant supply tubes 720. Sleeve 714 includes a plurality of jets 722, a plurality of plenums 724, a plurality of bearings assemblies 726, and a plurality of seals 728. Receiver member 716 includes a race 730, a plurality of receiver member channels 732, a receiver member lip 734, and a receiver member lip channels 736. Ring gear 704 includes a plurality of ring gear channels 738 and a plurality of ring gear openings 740. The structure of the embodiment shown in FIG. 7 is similar to the structure of the embodiment shown in FIG. 6. However, an additional receiver member lip 734 is appended to receiver member 716 and sleeve 714 is oriented to deliver lubricant in the axial direction of power engine shaft 706 rather than in the radial direction.

Epicyclic gear train 700 has the same structural configuration as epicyclic gear train 200 (shown in FIG. 2) with the addition of the lubricant supply system 702. Lubricant supply system 702 is in flow communication with sleeve 714 through lubricant supply tubes 720. Sleeve 714 is in flow communication with receiver member 716 through jets 722 and race 730. Receiver member 716 is in flow communication with ring gear 704 through receiver member lip channels 736, receiver member channels 732, and ring gear channels 738. Ring gear 704 is in flow communication with the epicyclic gear train 700 through ring gear channels 738 and ring gear openings 740.

Lubricant supply system 702 is in flow communication with sleeve 714 through lubricant supply tubes 720 and sleeve 714 is in flow communication with receiver member 716. Sleeve 714 circumscribes power engine shaft 706 and is fixedly coupled to integrated drive power gearbox 116 (shown in FIG. 1). Lubricant supply tubes 720 are coupled in flow communication with plenums 724 which are coupled in flow communication with jets 722 that are coupled in flow communication with race 730. Sleeve 714 and jets 722 are configured to deliver lubricant in the axially forward direction. Jets 722 are skewed to direct lubricant in the tangential direction of rotational motion of receiver member 716. Sleeve 714 includes bearing assemblies 726 radially outward and inward of jets 722. Bearing assemblies 726 may be journal bearings, rolling-element bearings, or any other suitable bearings. Sleeve 714 includes seals 728 radially inward and outward of bearing assemblies 726. In an embodiment, seals 728 are carbon seals. In another embodiment, seals 728 are fabricated from any other suitable material.

Sleeve 714 is in flow communication with epicyclic gear train 700 through receiver member 716 which is rotationally coupled to and extends axially aft from planetary gears 710. In the exemplary embodiment, receiver member 716 is cylindrical and circumscribes power engine shaft 706. Receiver member lip 734 is rotationally coupled to an end of receiver member 716 opposite an end coupled to ring gear 704. Receiver member lip 734 has an inner diameter substantially similar to the inner diameter of receiver member 716. Receiver member lip 734 extends radial outward from the axis of power engine shaft 704 from an end of receiver member 716. Receiver member lip 734 includes race 730 in an axially aft facing surface of receiver member lip 742. Receiver member lip 734 includes receiver member lip channels 736 in flow communication with race 730. Receiver member channels 732 are disposed within receiver member 716 and coupled in flow communication with receiver member lip channels 736. Ring gear channels 738 are disposed within ring gear 704 and coupled in flow communication with receiver member channels 732. Ring gear channels 738 include a first portion 739 and a second portion 741. First portion 739 extends axially forward from receiver member channels 732 to a point 744 within ring gear 704. Second portion 741 extends radially outward from point 744 within ring gear 704 to ring gear openings 740 on the radially inner surface of ring gear 704.

Oil deflection shield 718 circumscribes receiver member 716 and sleeve 714 and is fixedly coupled to integrated drive power gearbox 116 (shown in FIG. 1). Oil deflection shield 718 is configured to collect lubricant removed from planetary gears 710, sun gear 708, and ring gear 704 and return the lubricant to lubricant supply system 702.

Epicyclic gear train 700 is configured in the star operational embodiment. Carrier 712 remains stationary while sun gear 708 and ring gear 704 rotate. Power engine shaft 706 drives sun gear 708. Sun gear 708 is configured to rotate planetary gears 710 which are configured to rotate ring gear 704. Carrier 712 is fixedly coupled to integrated drive power gearbox 116 (shown in FIG. 1). Carrier 712 maintains planetary gears 710 positioning while allowing planetary gears 710 to rotate. Ring gear 704 is rotationally coupled to power engine rotor 122 (shown in FIG. 1) extending axially from ring gear 704. Jets 722 are configured to deliver lubricant to race 730. Jets 722 are configured to remain stationary while race 730 is configured to rotate during lubricant delivery. Race 730 is configured to deliver lubricant to receiver member channels 732. Receiver member channels 732 are configured to deliver lubricant to ring gear channels 734.

In another embodiment, openings (not shown) in an axially aft facing surface of receiver member lip 742 replace race 730. The openings (not shown) are skewed to receive lubricant in the tangential direction of rotational motion of receiver member 716.

The above-described lubricant supply systems provide an efficient method for supplying lubrication to an integrated drive power gearbox. Specifically, the above-described lubricant supply system delivers lubricant directly to the gears. When lubricant is delivered directly to the gears, heat is efficiently removed from the gears and stress on the gears is reduced. As such, providing lubricant directly to the gears improves the reliability of the integrated drive power gearbox. Additionally, integrating the lubricant supply system within the integrated drive power gearbox reduces the weight of the gearbox.

Exemplary embodiments of lubricant supply systems are described above in detail. The lubricant supply systems, and methods of operating such systems and devices are not limited to the specific embodiments described herein, but rather, components of systems and/or steps of the methods may be utilized independently and separately from other components and/or steps described herein. For example, the methods may also be used in combination with other systems requiring lubrication, and are not limited to practice with only the systems and methods as described herein. Rather, the exemplary embodiment can be implemented and utilized in connection with many other machinery applications that are currently configured to receive and accept lubricant supply systems.

Example methods and apparatus for supplying lubricant to an integrated drive power gearbox are described above in detail. The apparatus illustrated is not limited to the specific embodiments described herein, but rather, components of each may be utilized independently and separately from other components described herein. Each system component can also be used in combination with other system components.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A gas turbine engine assembly comprising:
   a fan assembly comprising an axis of rotation; and
   a gear assembly configured to drive said fan assembly through a first shaft from a coupling to a power drive shaft, said gear assembly comprising:
      a sleeve assembly at least partially surrounding said power drive shaft and coupled within a housing of the gear assembly, said sleeve assembly configured to receive a plurality of externally modulated flows of oil through said power drive shaft and to distribute the flows of oil through respective channels of a plurality of sleeve channels, said channels angled with respect to a radial line extending from said sleeve assembly in a direction of rotation of a rotating receiver of said sleeve assembly;
      one or more seals extending circumferentially between said sleeve assembly and said power drive shaft; and
      an oil deflection shield circumscribing said power drive shaft at least one of forward of said one or more seals and aft of said one or more seals.

2. The gas turbine engine assembly of claim 1, further comprising a bearing assembly integral with said sleeve assembly, a diameter of an inner surface of said bearing assembly being approximately equal to an outer diameter of a surface of the power drive shaft, said bearing assembly comprises a rolling element bearing.

3. The gas turbine engine assembly of claim 2, wherein said bearing assembly comprises two axially spaced elements.

4. The gas turbine engine assembly of claim 3, wherein said one or more seals comprise carbon seals, said one or more seals spaced axially at least one of forward of said bearing assembly and aft of said bearing assembly.

5. The gas turbine engine assembly of claim 1, wherein said sleeve assembly is configured to transfer said plurality of externally modulated flows of oil radially from said sleeve assembly to a rotating receiver member through respective channels of a plurality of radially outwardly directed channels, said channels angled with respect to a radial of said sleeve assembly in a direction of rotation of the power drive shaft.

6. The gas turbine engine assembly of claim 1, wherein said sleeve assembly is configured to transfer said plurality of externally modulated flows of oil axially from said sleeve assembly to a rotating receiver member through the respective channels of the plurality of radially outwardly directed channels, said channels angled with respect to a radial of said sleeve assembly in a direction of rotation of the power drive shaft, said sleeve assembly and said rotating receiver member comprising complementary flanges arranged face-to-face.

7. The gas turbine engine assembly of claim 1, wherein a carrier is fixedly coupled to and rotates with said fan assembly, said carrier further comprises an inducer mounted thereon.

8. A method of lubricating a gearbox comprising:
   supplying a flow of lubricant through a plurality of conduits to the gearbox;
   passing a portion of the supplied lubricant through the gearbox to a downstream lubricant load;
   channeling the flow of lubricant to a jet opening configured to direct the flow of lubricant axially across a gap from a stationary member to a rotating member; and
   channeling the flow of lubricant to a planetary gear assembly within said gearbox, said planetary gear assembly comprising a plurality of planetary gears supported by a carrier, said carrier coupled to a load through a shaft.

9. The method of claim 8, further comprising maintaining a temperature of the flow of lubricant in a predetermined range to control a viscosity of the lubricant in the flow of lubricant.

10. The method of claim 8, further comprising modulating the flow of lubricant external to the gearbox.

11. The method of claim 8, further comprising deflecting a quantity of lubricant in the gearbox away from the planetary gears, collecting the quantity of lubricant in the gearbox, and returning the collected lubricant to a lubricant supply.

12. A turbofan engine comprising:
   a core engine including a multistage compressor:
   a fan assembly comprising an axis of rotation and powered by said core engine;
   a fan bypass duct at least partially surrounding said core engine and said fan;
   a gear assembly configured to drive said fan assembly through a first shaft from a coupling to a power drive shaft, said gear assembly comprising:
      a sleeve assembly at least partially surrounding said power drive shaft and coupled to a housing of the gear assembly, said sleeve assembly configured to receive a plurality of externally modulated flows of oil through said power drive shaft and to distribute the flows of oil through respective channels of a plurality of radially outwardly directed channels, said channels angled with respect to a radial line extending from said sleeve assembly in a direction of rotation of power drive shaft;
      a bearing assembly integral with said sleeve assembly, a diameter of an inner surface of said bearing assembly being approximately equal to an outer diameter of a surface of the power drive shaft;
      one or more seals extending circumferentially between said sleeve assembly and said power drive shaft, said one or more seals spaced axially at least one of forward of said bearing assembly and aft of said bearing assembly; and
      an oil deflection shield circumscribing said power drive shaft at least one of forward of said one or more seals and aft of said one or more seals.

13. The turbofan engine of claim 12, wherein said bearing assembly comprises at least one of a rolling element bearing and a journal bearing.

14. The turbofan engine of claim 12, wherein said bearing assembly comprises two axially spaced elements.

15. The turbofan engine of claim 12, wherein said one or more seals comprise carbon seals.

16. The gas turbine engine assembly of claim 12, wherein said sleeve assembly is configured to transfer said plurality of externally modulated flows of oil radially from said sleeve assembly to a rotating receiver member through respective channels of a plurality of radially outwardly directed channels, said channels angled with respect to a radial line extending from said sleeve assembly in a direction of rotation of the power drive shaft.

17. The gas turbine engine assembly of claim 12, wherein said sleeve assembly is configured to transfer said plurality of externally modulated flows of oil axially from said sleeve assembly to a rotating receiver member through the respective channels of the plurality of radially outwardly directed channels, said channels angled with respect to a radial of said sleeve assembly in a direction of rotation of the power drive shaft, said sleeve assembly and said rotating receiver member comprising complementary flanges arranged face-to-face.

18. The gas turbine engine assembly of claim 12, wherein a carrier is fixedly coupled to and rotates with said fan assembly, said carrier further comprises an inducer mounted thereon.

* * * * *